(12) United States Patent
Maehara (10) Patent No.: US 8,925,605 B2
(45) Date of Patent: Jan. 6, 2015

(54) RUN-FLAT TIRE

(75) Inventor: Daisuke Maehara, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 105 days.

(21) Appl. No.: 13/392,180

(22) PCT Filed: Aug. 25, 2010

(86) PCT No.: PCT/JP2010/005229
§ 371 (c)(1),
(2), (4) Date: Feb. 24, 2012

(87) PCT Pub. No.: WO2011/024447
PCT Pub. Date: Mar. 3, 2011

(65) Prior Publication Data
US 2012/0152426 A1  Jun. 21, 2012

(30) Foreign Application Priority Data

Aug. 26, 2009 (JP) ................. 2009-195935

(51) Int. Cl.
*B60C 17/00* (2006.01)
*B60C 9/04* (2006.01)
*B60C 13/00* (2006.01)
*B60C 15/00* (2006.01)
*B60C 9/09* (2006.01)
*B60C 9/02* (2006.01)

(52) U.S. Cl.
CPC ..... *B60C 17/0009* (2013.04); *B60C 2009/0416* (2013.04); *B60C 13/00* (2013.01); *B60C 9/04* (2013.01); *B60C 15/0018* (2013.04); *B60C 2009/0475* (2013.04); *B60C 15/0009* (2013.04); *B60C 9/09* (2013.01); *B60C 2015/009* (2013.04); *B60C 9/0207* (2013.04); *B60C 2009/0433* (2013.04)

USPC ........... 152/517; 152/550; 152/551; 152/554; 152/555; 152/556; 152/557

(58) Field of Classification Search
USPC ......... 152/517, 556, 516, 557, 550, 551, 554, 152/555
See application file for complete search history.

(56) References Cited

U.S. PATENT DOCUMENTS 3,929,180 A * 12/1975 Kawase et al. ................. 152/556
5,795,416 A *  8/1998 Willard et al. ................. 152/517
(Continued)

FOREIGN PATENT DOCUMENTS

CN   101505977 A   8/2009
EP    2042349 A1   4/2009
(Continued)

OTHER PUBLICATIONS

English machine translation of JP 2008-24188 A, Feb. 7, 2008.*
(Continued)

*Primary Examiner* — Adrienne C Johnstone
(74) *Attorney, Agent, or Firm* — Sughrue Mion, PLLC (57) ABSTRACT

Provided is a run-flat tire in which a side-reinforcing rubber is arranged on the inside of the carcass in the tire width direction on both sidewall portions. The carcass plies include cords made of a material having a heat shrinkage rate of 2% to 8% at 177° C., and the run-flat tire further includes a reinforcing cord layer which includes cords made of a material having a heat shrinkage rate of less than 2% at 177° C., the reinforcing cord layer being arranged on the outside of the side-reinforcing rubber in the tire width direction on both sidewall portions.

4 Claims, 4 Drawing Sheets

(56) References Cited

U.S. PATENT DOCUMENTS

| | | | |
|---|---|---|---|
| 5,871,600 A * | 2/1999 | Oare et al. | 152/517 X |
| 6,135,183 A | 10/2000 | Oare et al. | |
| 6,439,283 B1 | 8/2002 | Paonessa et al. | |
| 6,619,354 B1 * | 9/2003 | Kobayashi et al. | 152/517 |
| 7,195,046 B2 * | 3/2007 | Kobayashi et al. | 152/517 X |
| 7,448,422 B2 * | 11/2008 | Markoff et al. | 152/517 X |
| 7,650,921 B2 * | 1/2010 | Tanaka | 152/517 |
| 2004/0261928 A1 | 12/2004 | Imhoff et al. | |

FOREIGN PATENT DOCUMENTS

| | | |
|---|---|---|
| JP | 11-291725 A | 10/1999 |
| JP | 2002-500587 A | 1/2002 |
| JP | 2002-500589 A | 1/2002 |
| JP | 2004-306658 A | 11/2004 |
| JP | 2005-14889 A | 1/2005 |
| JP | 2006-341771 A | 12/2006 |
| JP | 2008024188 A * | 2/2008 |
| JP | 2009-18771 A | 1/2009 |
| JP | 2009-137449 A | 6/2009 |
| JP | 2009-264012 A | 11/2009 |
| JP | 2010-247698 A | 11/2010 |
| JP | 2011-079360 A | 4/2011 |

OTHER PUBLICATIONS

Office Action issued Mar. 27, 2014 from the State Intellectual Property Office of P. R. China in a counterpart Chinese Application No. 201080044054.8.

Extended European Search Report issued Nov. 25, 2013 in European Patent Application No. 10811505.6.

Communication dated Oct. 20, 2014, issued by the State Intellectual Property Office of the People's Republic of China in Chinese Application No. 201080044054.8.

* cited by examiner

FIG. 1

Conventional Art

Potential energy = Mgh

RUN-FLAT TIRE

CROSS REFERENCE TO RELATED APPLICATIONS

This application is a National Stage of International Application No. PCT/JP2010/005229 filed Aug. 25, 2010, claiming priority based on Japanese Patent Application No. 2009-195935 filed Aug. 26, 2009, the contents of all of which are incorporated herein by reference in their entirety.

TECHNICAL FIELD

The present invention relates to a run-flat tire of a sidewall-reinforced type in which a reinforcing rubber is arranged in a sidewall portion so as to enhance rigidity, and more particularly to a run-flat tire which is improved in ride comfort through suppressing vibration during running and further increased in run-flat durability (durability after a puncture, which may also be abbreviated as RF durability hereinafter).

RELATED ART

As a run-flat tire capable of safely running over a certain distance even in a punctured state (at zero internal pressure), there is conventionally known a run-flat tire of sidewall-reinforced type in which a reinforcing rubber is provided in a sidewall portion so as to enhance rigidity as disclosed in Japanese Patent Application Laid-Open Nos. 2009-264012, 2002-500587, 2002-500589, and 2004-306658.

The run-flat tire as described above can be used so as to allow a driver to continue driving to a safe place without losing maneuverability even when, for example, the tire suddenly goes flat during the vehicle moving on a freeway. Therefore, there is no need to change the tire in a dangerous place, which can eliminate the risk of an accident.

Further, no spare tire needs to be carried in a vehicle, which leads to an improvement in fuel efficiency, and also offers various other advantages such as an environmental benefit that the number of scrap tires can be reduced and an advantage in design by increasing the degree of freedom in vehicle layout and by making application to an electronic vehicle easier.

On the other hand, the run-flat tire includes, in a sidewall portion, a side-reinforcing rubber formed of a rubber composition that is higher in rigidity than the surrounding rubber components, which makes the modulus of elasticity of the tire in the load direction higher as compared to a normal tire, leading to an increase in radial force variation (RFV). As a result, the uniformity is deteriorated, which may cause vibrations in running. In particular, there has been a problem that stable ride comfort is difficult to attain on a good flat road.

Here, the radial force variation refers to a variation of force in the tire radial direction (z-axis direction) that occurs when the tire under load rotates one revolution at a certain radius. Hereinafter, the radial force variation may also be abbreviated as RFV.

DISCLOSURE OF THE INVENTION

Problems to be Solved by the Invention

The inventors of the present invention have made various studies on methods to solve the above-mentioned problem, and discovered the followings. That is, a rayon material used for a carcass ply of many run-flat tires has a thermal shrinkage rate that is as significantly small as ⅓ of that of a PET material used for a carcass ply of normal tires. As a result, ply cords on the circumference of a product tire after vulcanization vary considerably in length, resulting in an increase in RFV.

On the other hand, as to the carcass ply of a run-flat tire, the run-flat tire sees an increase in temperature to approximately 200° C. at the periphery of the side-reinforcing rubber while running at zero internal pressure. Accordingly, if the above-mentioned PET material, which lacks heat resistance, is used for the carcass ply of a run-flat tire, a fracture may occur within a short period of time and thus a sufficient driving distance cannot be ensured. For this reason, with the objective of retaining the RF durability, it has been hitherto difficult to use a PET material for a run-flat tire.

Further, from the standpoint of the tire strength, it is preferred to use, as a carcass material of a run-flat tire, a material that is particularly strong. The reason is that the tire may be unexpectedly subjected to excessive vertical input motions when running on a road surface that has bumps and dips such as potholes over a certain distance.

In the run-flat tire, the reinforcing rubber portion is compressed under load so that a tensile stress works on the ply material arranged on the outside of the reinforcing rubber portion, to thereby manifest a structural rigidity (for supporting the load at zero internal pressure). However, even when the tire is filled with a normal internal pressure, the run-flat tire is more susceptible to tensile fracture as compared to a normal tire when suddenly subjected to an excessive vertical input motion (severalfold larger than a maximum load) exceeding the normal internal pressure.

Figure 1:
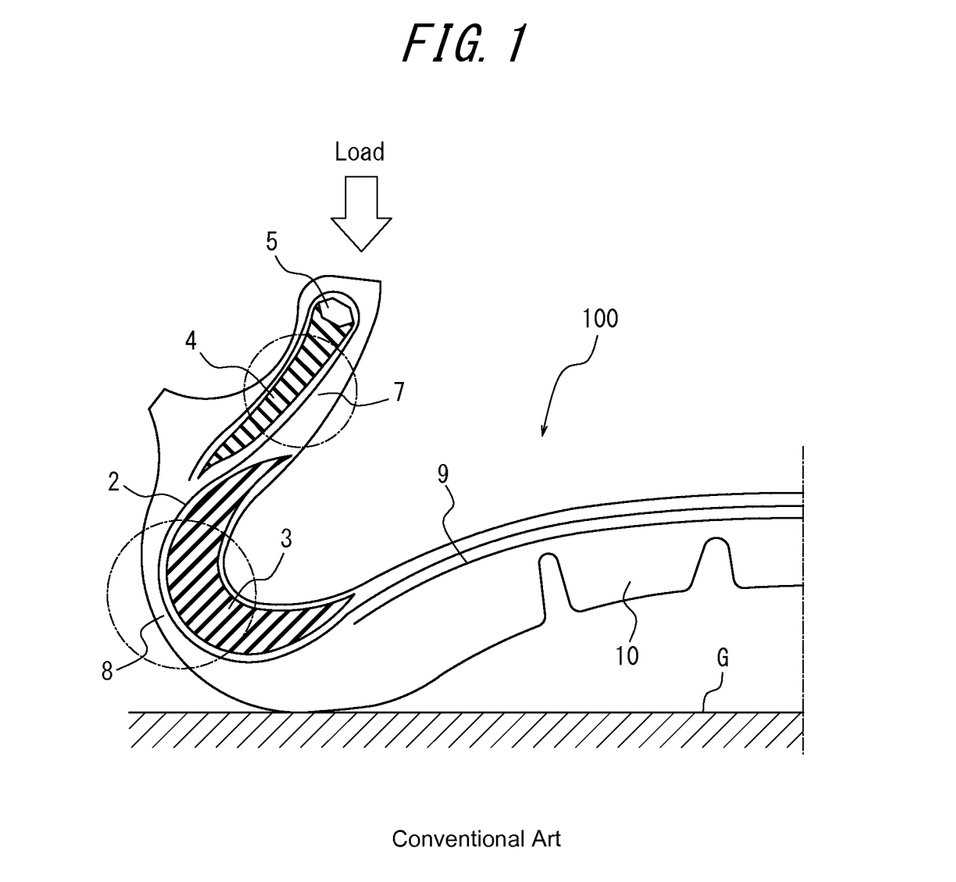
FIG. 1 A sectional view in a width direction of a half of a conventional run-flat tire running at zero internal pressure.

FIG. 1 is a sectional view in a width direction of a half of a conventional run-flat tire 100 of sidewall-reinforced type running at zero internal pressure, which is in contact with a road surface. The run-flat tire 100 of FIG. 1 includes one carcass 2 as a skelton, which toroidally extends across between a pair of bead portions 7. The run-flat tire 100 further has a belt 9 and a tread portion 10 arranged in order on the outside in the radial direction of a crown portion of the carcass 2, a sidewall portion 8 falling between the tread portion 10 and each of the bead portions 7, a bead core 5 and a bead filler 4 arranged in each of the bead portions 7, and a side-reinforcing rubber 3 arranged on the inside of the carcass 2 at each of the sidewall portions 8. In the example of FIG. 1, the run-flat tire 100 contacts with a road surface G at zero internal pressure and is deflected under load in a direction toward the road surface.

As illustrated in FIG. 1, when the run-flat tire 100 is placed under load, the side-reinforcing rubber 3 and the bead filler 4 are distorted, which increases the path length of the carcass 2, with the result that the tire is subjected to a strong tensile stress in the peripheries of the sidewall portion 8 and of the bead portion 7 (regions each circled with a broken line in the example of FIG. 1). In particular, the carcass 2 near the sidewall portion 8 tends to be exposed to a larger tensile stress as being sandwiched in between the road surface and the reinforcing rubber 3, and hence, the tensile strength of cords used for the carcass ply matters particularly at these portions. Therefore, in view of the problem, it may be effective to use a PET material that exhibits a strength per unit of dtex that is 1.5 to 1.7 times larger than that of rayon, as long as the carcass ply would not be subjected to a high temperature of approximately 200° C.

In order to attain the same strength as PET when using rayon, it is necessary to increase the diameter of each cord or to increase the cord count per unit length, both of which are not preferable in view of fuel efficiency and ride comfort because tire weight is also increased inadvertently. In addition, the fact that rayon is higher in specific gravity by 10% than PET also results in a disadvantage in weight.

As described above, in the conventional run-flat tire, it has been difficult to attain both ride comfort and RF durability at the same time. Therefore, in view of the problem described above, it is an object of the present invention to provide a run-flat tire which is improved in ride comfort through suppressing vibration during running and also excellent in run-flat durability at the same time.

Means for Solving the Problem

The inventors have made further studies on methods of suppressing vibrations resulting from a larger RFV in run-flat running so as to improve ride comfort while also increasing RF durability at the same time, and have discovered the followings. That is, the problem resides in that, in the first place, the carcass ply of a run-flat tire is required to have two functions, namely, a function of holding shape when filled with an internal pressure and a function of supporting load under high temperature during run-flat running. The inventors have found out that the structure can be elaborated so as to separate those functions so that different material can be assigned to each desired function, to thereby solve the above-mentioned problem. Therefore, in order to solve the above-mentioned problem, the present invention is basically configured as follows.

(1) A run-flat tire, including:
a carcass, as a skeleton, formed of at least one carcass ply toroidally extending across between bead cores embedded in a pair of bead portions;
a belt and a tread portion arranged in order on the outside of a crown portion of the carcass in a radial direction;
a sidewall portion falling between the tread portion and each of the bead portions; and
a side-reinforcing rubber arranged on the inside of the carcass at each sidewall portion in the tire width direction,
in which the carcass ply includes cords made of a material having a thermal shrinkage rate of 2% to 8% at 177° C.;
in which the run-flat tire further includes, on the outside of the side-reinforcing rubber of each sidewall portion in the tire width direction, a reinforcing cord layer including cords made of a material having a thermal shrinkage rate of less than 2% at 177° C.

(2) The run-flat tire according to the above-mentioned aspect (1), in which the carcass ply includes cords made of polyester fibers.

As polyester fibers, polyethylene terephthalate (PET) and polyethylene naphthalate (PEN) may be recited by way of example.

(3) The run-flat tire according to the above-mentioned aspect (1) or (2), in which the reinforcing cord layer includes cords made of cellulosic fibers.

As cellulosic fibers, rayon and lyocell may be recited by way of example.

(4) The run-flat tire according to any one of the above-mentioned aspects (1) to (3), in which the cords of the reinforcing cord layer are at an inclination angle of 0 to 20 degrees with respect to the tire radial direction.

(5) The run-flat tire according to any one of the above-mentioned aspects (1) to (4),
in which the reinforcing cord layer has an end portion on the belt side lying on the inside in the tire width direction than a widthwise end portion of the belt, and the reinforcing cord layer further has another end portion on the bead side, the bead side end portion extending as being wound around the bead core from inside to outside in the tire width direction.

Here, the end portion on the belt side of the reinforcing cord layer corresponds to an end portion closer to the outermost side of the reinforcing cord layer in the tire radial direction in section in the tire width direction. The bead side end portion of the reinforcing cord layer corresponds to an end portion opposite to the belt side end portion in a section in the tire width direction. Further, the end portion of the belt in the tire width direction refers to, when the belt is formed of a plurality of belt layers, an outermost end portion in the tire width direction of the belt layer that has a maximum width.

(6) The run-flat tire according to any one of the above-mentioned aspects (1) to (5) further including a bead filler arranged on the outside of the bead core in the tire radial direction, in which at least one of the carcass and the reinforcing cord layer accommodates the bead filler.

Here, when the bead filler is accommodated, at least one of the carcass and the reinforcing cord layer extends as being wound around the bead core from inside to outside in the tire width direction and the leading end of the portion thus folded back reaches higher than the height of the bead filler in the tire radial direction.

(7) The run-flat tire according to any one of the above-mentioned aspects (1) to (6),
in which the carcass is adapted to extend as being wound around the bead core from inside to outside in the tire width direction, and
in which the carcass thus folded back has a leading end that reaches a height of 25 mm or less in the tire radial direction.

Here, the height in the tire radial direction is measured from a bead base line in the tire radial direction. The bead base line is defined by a straight line that passes through the bead toe of the tire to extend parallel to a rotation axis of the tire.

As described above, when the carcass is adapted to extend as being wound around the bead core, the height in the tire radial direction reached by the leading end of the carcass thus folded back may also be referred to as folding height CH of the carcass hereinafter. Similarly, when the reinforcing cord layer is adapted to extend as being wound around the bead core, the height in the tire radial direction reached by the leading end of the reinforcing cord layer thus folded back may also be referred to as folding height RH of the reinforcing cord layer hereinafter.

Effect of the Invention

The run-flat tire according to the present invention employs, as a carcass ply, a material that has a large thermal shrinkage rate, which makes the length of the ply cords uniform in a product tire after vulcanization, to thereby favorably alleviate the RFV. As a result, the vibration during running, which has been conceived as a conventional problem, can be reduced.

In addition, the run-flat tire according to the present invention employs a material having a low thermal shrinkage rate, that is, a material excellent in heat resistance, on the outside in the tire width direction of the side-reinforcing rubber in each sidewall portion, to thereby increase run-flat durability.

BEST MODES FOR CARRYING OUT THE INVENTION

In the following, the present invention is described with reference to the accompanying drawings.

Figure 2:
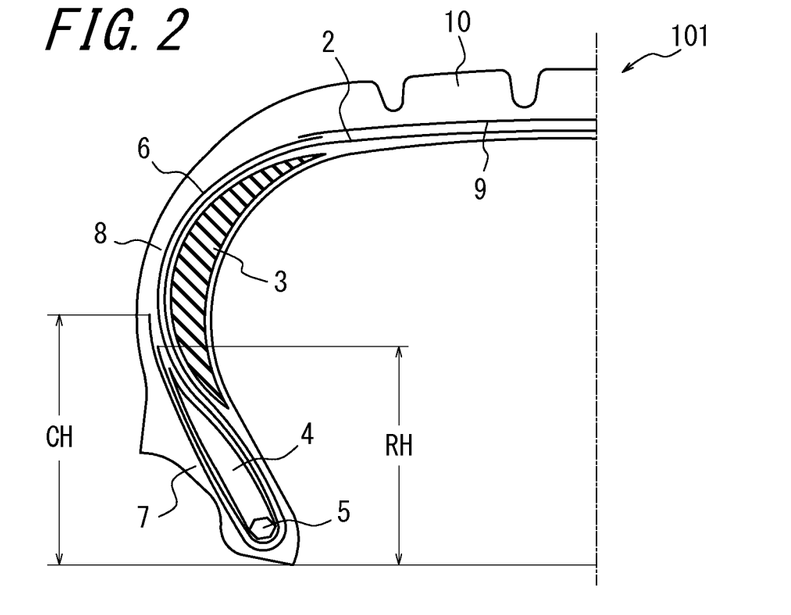
FIG. 2 A sectional view in a width direction of a half of a run-flat tire according to the present invention.

FIGS. 2 to 6 each are a sectional view in a width direction of a run-flat tire according to an embodiment of the present invention. The run-flat tire 101 of FIG. 2 includes a carcass 2 as a skeleton. The carcass 2, which may be formed of one or more carcass plies, is formed of one carcass ply in the example, and extends toroidally across between bead cores 5 embedded in a pair of bead portions 7. The run-flat tire 101 further has a belt 9 and a tread portion 10 arranged in order on the outside in a radial direction of a crown portion of the carcass 2, a sidewall portion 8 falling between the tread portion 10 and each of the bead portions 7, and a side-reinforcing rubber 3 arranged on the inside of the carcass 2 at each sidewall portion 8 in the tire width direction. In the example of FIG. 2, the side-reinforcing rubber 3 has a substantially crescent shape in cross section. Further, the run-flat tire 101 of FIG. 2 has a bead filler 4 on the outside of the bead core 5 in the tire radial direction.

Here, in the present invention, it is essential that the carcass ply includes cords made of a material having a thermal shrinkage rate of 2 to 8% at 177° C., and that the run-flat tire 101 includes, on the outside of the side-reinforcing rubber 3 of each sidewall portion 8 in the tire width direction, a reinforcing cord layer 6 including cords made of a material having a thermal shrinkage rate of less than 2% at 177° C.

In the embodiment illustrated in FIG. 2, an end portion on the belt side of the reinforcing cord layer 6 lies inside in the tire width direction than a widthwise end of the belt 9. Further, another end portion on the bead side of the reinforcing cord layer 6 extends as being wound around the bead core 5 from inside to outside in the tire width direction. Further, in the above-mentioned embodiment, the carcass 2 extends as being wound around the bead core 5 from inside to outside in the tire width direction, and may preferably be formed as a radial carcass.

In the present invention, the thermal shrinkage rate is calculated as follows. That is, a sample (of 250 mm in length) is placed in an oven at 177° C. for 120 seconds, and then measured for an amount of shrinkage in the length direction. Then, the amount of shrinkage thus measured is divided by the entire length of the sample, to thereby obtain the thermal shrinkage rate.

As described above, the use of a material having a high thermal shrinkage rate for a ply of the carcass 2 makes the length of the ply cords uniform in a tire after vulcanization, which alleviates the RFV. As a result, tire vibration can be reduced, to thereby improve ride comfort.

Further, the reinforcing cord layer 6 including cords made of a material having a low thermal shrinkage rate, that is, a material having a high heat resistance, is arranged on the outside of the side-reinforcing rubber 3 in the tire width direction, thereby making it possible to improve the RF durability of the tire. Specifically, the reinforcing cord layer 6 is excellent in heat resistance, and thus can provide necessary rigidity even in a high-temperature region (at the maximum temperature of almost 200° C.) around the reinforcing rubber 3, so as to prevent the cords from fracturing due to heat at an early point, to thereby ensure a sufficient run-flat driving distance.

Therefore, the present invention can provide a run-flat tire that is excellent in both ride comfort and RF durability.

The arrangement of the reinforcing cord layer 6 is not particularly limited as long as the reinforcing cord layer 6 is arranged on the outside of the reinforcing rubber 3 in the tire width direction. For example, the reinforcing cord layer 6 may also be arranged on the inside of the carcass 2 in the tire radial direction, that is, may be arranged between the carcass 2 and the reinforcing rubber 3.

Further, in the run-flat tire of the present invention, the carcass ply may preferably include cords made of polyester fibers. In general, polyester fibers are higher in strength as compared to cellulosic fiber materials. Therefore, when polyester fibers are employed for the cords of the carcass ply, the tire can be improved in side-cut resistance. Here, the term "side-cut resistance" refers to the durability of a tire against damage or a fracture that occurs in the sidewall portion 8 when the tire fiercely hit surface irregularities (such as potholes and cat's eyes) on a road or when the tire is subjected to unexpected vertical input motions on a road with bumps.

Further, in the run-flat tire of the present invention, the reinforcing cord layer 6 may preferably include cords made of cellulosic fibers. In general, cellulosic fibers are smaller in thermal shrinkage rate and thus excellent in heat resistance, as compared to polyester fibers. For this reason, when cords made of cellulosic fibers are arranged in the reinforcing cord layer 6, the tire can further be improved in RF durability.

In addition, in the run-flat tire of the present invention, the cords of the reinforcing cord layer 6 may preferably be at an inclination angle of 0 to 20 degrees to the tire radial direction.

In general, the reinforcing cord layer 6 externally restrains bending deformation of the reinforcing rubber 3, to thereby maintain the shape of the tire during run-flat driving of the tire. The inclination angle of the cords of the reinforcing cord layer 6 with respect to the tire radial direction can be confined to the above-mentioned range, so as to improve rigidity of the reinforcing cord layer 6 against the elongation of the reinforcing cord layer 6 in the tire circumferential direction, to thereby improve the RF durability of the tire.

Still further, the run-flat tire of the present invention may preferably be configured, as in the example illustrated in FIG. 2, such that an end portion on the belt side of the reinforcing cord layer 6 lies inside in the tire width direction than a widthwise end portion of the belt 9, and another end portion on the bead side of the reinforcing cord layer 6 extends as being wound around the bead core 5 from inside to outside in the tire width direction.

As illustrated in FIG. 2, the end portion on the belt side of the reinforcing cord layer 6 lies inside in the tire width direction than the widthwise end portion of the belt 9, and further, another end portion on the bead side of the reinforcing cord layer 6 is wound around the bead core 5 from inside to outside, so that the reinforcing cord layer 6 can more rigidly restrain the bending deformation of the side-reinforcing rubber 3. With this configuration, the RF durability can further be improved. Further, the reinforcing cord layer 6 is configured as described above so as to be suitably applied to various road surface conditions, and various tire sizes and vehicle weights that are conceivable in the market.

Figure 4:
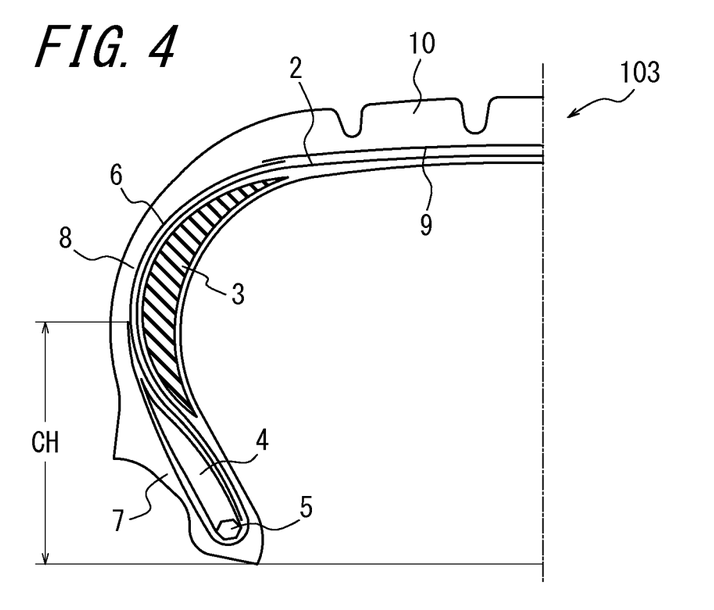
FIG. 4 A sectional view in a width direction of a half of a run-flat tire according to the present invention.
Figure 5:
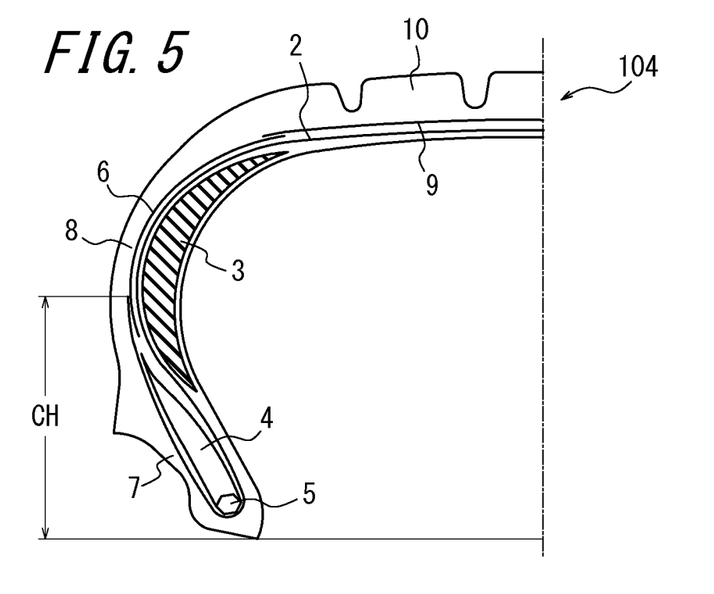
FIG. 5 A sectional view in a width direction of a half of a run-flat tire according to the present invention.
Figure 6:
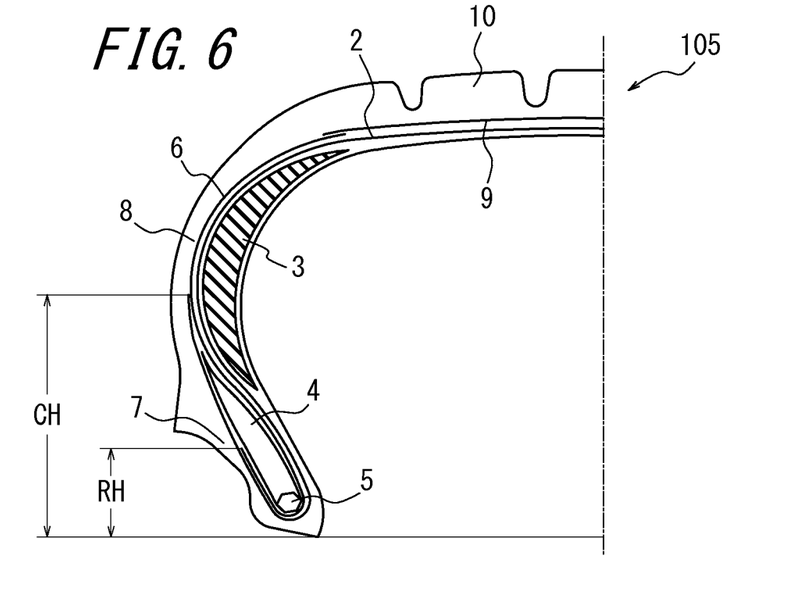
FIG. 6 A sectional view in a width direction of a half of a run-flat tire according to the present invention.

Alternatively, the run-flat tire of the present invention may also be configured as, for example, run-flat tires 103 and 104 illustrated in FIGS. 4 and 5, respectively, in which an end portion on the bead side of the reinforcing cord layer 6 extends short of the bead core 5 without being wound around to be folded back at the bead core 5. For example, when the vehicle is lightweight, the above-mentioned structure is sufficient enough to ensure the tire strength, and hence the tire can be reduced in weight along with the reduction in weight of the reinforcing cord layer 6.

In addition, in the run-flat tire of the present invention, it is preferred that the bead filler 4 is arranged on the outside of the bead core 5 in the tire radial direction, and that at least one of the carcass 2 and the reinforcing cord layer 6 accommodates the bead filler 4.

In general, the bead filler 4 is high in hardness, which may result in separation of an end portion due to the deformation of the tire. In view of this, the bead filler 4 is covered and restrained by the carcass 2 or by the reinforcing cord layer 6 so as to suppress deformation of the bead portion 7, to thereby prevent the separation of the end portion.

Further, in the run-flat tire of the present invention, the carcass 2 is configured to extend as being wound around the bead core 5 from inside to outside in the tire width direction, and it is preferred that the folding height CH of the leading end of the carcass 2 in the tire radial direction is 25 mm or less.

Figure 3:
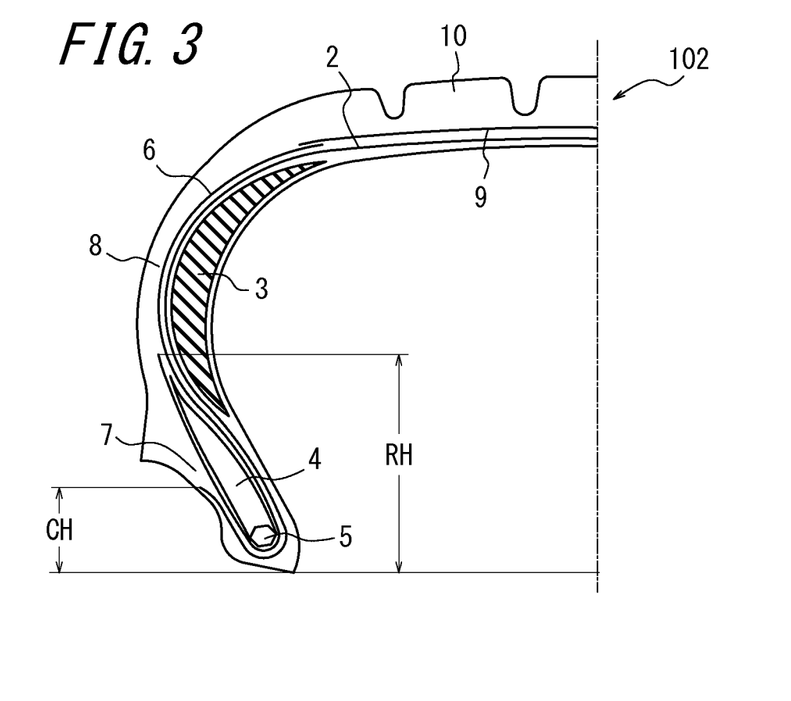
FIG. 3 A sectional view in a width direction of a half of a run-flat tire according to the present invention.

As in the run-flat tire 102 illustrated in FIG. 3, the carcass 2 can be folded back to the folding height CH of 25 mm or less, so as to reduce the weight of the tire.

Meanwhile, in the run-flat tire 101 of FIG. 2, the carcass 2 is folded back to the folding height CH of 60 mm and the reinforcing cord layer 6 is folded back to the folding height RH of 50 mm. In the run-flat tire 102 of FIG. 3, the carcass 2 is folded back to the folding height CH of 20 mm and the reinforcing cord layer 6 is folded back to the folding height RH of 50 mm. Further, both in the run-flat tire 103 of FIG. 4 and in the run-flat tire 104 of FIG. 5, the carcass 2 is folded back to the folding height CH of 60 mm and the reinforcing cord layer 6 extends short of the bead core 5. However, the run-flat tire 103 and the run-flat tire 104 are different from each other in width of the reinforcing cord layer 6. That is, the reinforcing cord layer 6 of the run-flat tire 103 is 90 mm in width, while the reinforcing cord layer 6 of the run-flat tire 104 is 60 mm in width. Further, in the run-flat tire 105 of FIG. 6, the carcass 2 is folded back to the folding height CH of 60 mm and the reinforcing cord layer 6 is folded back to the folding height RH of 20 mm.

The run-flat tires 101 to 105 according to the present invention described above are all the same in structure except in that each includes the carcass 2 and the reinforcing cord layer 6 that are differently structured as described above. The reinforcing cord layers 6 of the run-flat tires 101 to 105 according to the embodiments introduced in this specification are all configured in such a manner that the end portion thereof on the belt side lies inside in the tire width direction than the widthwise end portion of the belt 9, that is, the reinforcing cord layer 6 and the belt 9 overlap each other at the end portions thereof. However, in the run-flat tire of the present invention, the reinforcing cord layer 6 does not necessarily need to overlap with the belt 9 as long as the reinforcing cord layer 6 lies outside than the side-reinforcing rubber 3.

EXAMPLES

Figure 7:
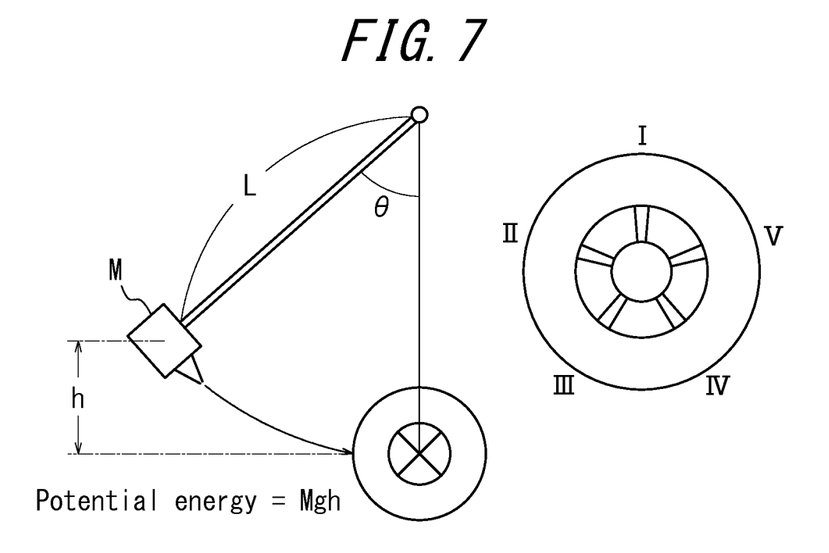
FIG. 7 A schematic view of a pendulum-type cut testing machine that served to evaluate the side-cut resistance.

In the following, the present invention is described in further detail with reference to examples. Here, FIG. 7 is a schematic view of a pendulum-type cut testing machine that served to evaluate the side-cut resistance of the following examples.

Five different run-flat tires each in a tire size of 245/45R19 were manufactured as Examples 1 to 5 according to the respective configurations of the run-flat tires 101 to 105 illustrated in FIGS. 2 to 6, respectively. As to Examples 1 to 5, Table 1 shows information on the carcass 2 regarding the structure, the material used for the ply, and the folding height CH thereof, on the reinforcing cord layer 6 regarding the materials, whether or not it is folded back, the width, and the folding height RH, and on the bead filler regarding the height thereof.

Meanwhile, as comparative targets for evaluation, two different run-flat tires each without the reinforcing cord layer 5 were manufactured as Comparative Examples 1 and 2 in the same size as Examples 1 to 5 described above. Here, Comparative Examples 1 and 2 were different from each other in that rayon and PET were used as materials forming the carcass plies in Comparative Examples 1 and 2, respectively. The rest of the dimensions of Comparative Examples 1 and 2 are shown in Table 1.

In this regard, referring to Table 1, in the row of the "carcass structure", 2P means that the carcass 2 includes two layers of carcass plies, and 1P means that the carcass 2 includes one layer of a carcass ply. Further, in Table 1, the "bead filler height" refers to a distance in the tire radial direction from the outermost end of the bead filler in the tire radial direction to the outermost end of the bead core in the tire radial direction.

These sample tires thus obtained were subjected to evaluation for the radial force variation (RFV), the run-flat durability (RF durability), the tire weight, and the side-cut resistance. The above-mentioned properties of each tire were each evaluated according to the following methods.

<<RFV>>

The sample tires were each mounted on a rim in a size of 7.5 J and subjected to evaluation according to the method described in JIS D 4233, under the conditions where the load was 5 kN and an internal pressure was 0.2 MPa. The evaluation was made on 20 run-flat tires for each Example, so as to obtain an average value as the evaluation result. In Table 1, the RFV of Comparative Example 1 is defined as 100 as an index value. When the value is smaller, the RFV is also smaller, which means that the tire is more excellent in performance.

<<RF Durability>>

The sample tires were each mounted on a rim in a size of 7.5 J and preheated for three hours under a temperature condition of 38° C. After that, the tire was brought into contact with a drum of a drum testing machine having a drum diameter of 1.6 m in a state where the valve core was pulled out from the tire, under the conditions where the load was 6.57 kN and a temperature was 38° C., and then the tire was driven at V=89 km/h so as to make the evaluation based on a distance to the burst. Here, the burst was detected by a vibration sensor attached to the drum testing device. In Table 1, the RF durability of Comparative Example 1 is defined as 100 as an index value. When the value is larger, the tire is more excellent in RF durability.

<<Tire Weight>>

The tires were measured for weight without being mounted on a rim. In Table 1, the tire weight of Comparative Example 1 is defined as 100 as an index value. The value is preferred to be smaller in view of attaining weight reduction.

<<Side-Cut Resistance>>

The sample tires were each mounted on a rim in a size of 7.5 J and filled with an internal pressure of 230 MPa. Then, using the pendulum-type testing machine of FIG. 7, which had a striker shape R=50 mm, a pendulum length L=1829 mm, and a pendulum weight M=81.0 kg, each sample tire was hit with the pendulum while the height h being changed, so as to determine the pendulum height h at which a raised portion called bulge was generated in a side portion due to a ply fracture caused by the hit, to thereby measure a potential energy Mgh at that time.

Each sample tire had five points I to V tested as illustrated in FIG. 7, so as to obtain an average value of those five points. In Table 1, the side-cut resistance of Comparative Example 1 is defined as 100 as an index value. When the value is larger, the tire is more excellent in side-cut resistance.

strength without having a carcass 2 formed in two-layer configuration, because of the reinforcing cord layer 6 provided thereto. As a result, the tire weight is reduced.

Further, when Examples 1 to 5 are compared with one another, Examples 1, 2, and 5 in which the reinforcing cord layer 6 is folded back at the bead core 5 are more excellent in RF durability as compared to Examples 3 and 4 in which the reinforcing cord layer 6 extends short of the bead core 5.

TABLE 1

|  | Comparative Example 1 | Comparative Example 2 | Example 1 | Example 2 | Example 3 | Example 4 | Example 5 |
|---|---|---|---|---|---|---|---|
| Carcass Structure | 2P | 2P | 1P | 1P | 1P | 1P | 1P |
| Material of Carcass Ply | rayon | PET | PET | PET | PET | PET | PET |
| Folding Height CH of Carcass | 60/35 | 60/35 | 60 | 20 | 60 | 60 | 60 |
| Presence/Absence of Reinforcing Cord Layer | absent | absent | present | present | present | present | present |
| Material of Reinforcing Cord Layer | — | — | rayon | rayon | rayon | rayon | rayon |
| Whether or not Reinforcing Cord Layer is folded back | — | — | folded | folded | not folded | not folded | folded |
| Width of Reinforcing Cord Layer | — | — | 170 | 170 | 90 | 60 | 130 |
| Folding Height RH of Reinforcing Cord Layer | — | — | 50 | 50 | — | — | 20 |
| Bead Filler Height | 45 | 45 | 45 | 45 | 45 | 45 | 45 |
| RFV (smaller value is better) | 100 | 69 | 71 | 70 | 70 | 69 | 70 |
| RF durability (larger value is better) | 100 | 45 | 100 | 100 | 90 | 85 | 95 |
| Tire Weight (smaller value is better) | 100 | 98 | 95 | 93 | 90 | 88 | 91 |
| Side-cut Resistance | 100 | 153 | 125 | 125 | 124 | 118 | 124 |

The results in Table 1 show that Examples 1 to 5 each structured according to the run-flat tire of the present invention are significantly excellent in terms of RFV as compared to Comparative Example 1 which has a carcass ply formed of rayon, and exhibit substantially the same performance as compared to Comparative Example 2 which has a carcass ply formed of PET.

Further, Table 1 shows that Comparative Example 2 that includes a carcass ply formed of a PET material and does not include the reinforcing cord layer 6 tends to be remarkably inferior in RF durability. In contrast, Examples 1 to 5 each having the reinforcing cord layer 6 that is excellent in heat resistance produced substantially the same effect in terms of RF durability as compared to Comparative Example 1 that includes a carcass formed of two layers of the carcass ply made of a rayon material that is excellent in heat resistance.

The above-mentioned results show that the run-flat tire according to the present invention is capable of attaining both the reduction of RFV and the improvement of RF durability, which has been difficult conventionally. Further, Examples 1 to 5 according to the present invention each attain a sufficient In addition, Examples 1 to 5 are found to be more excellent in terms of side-cut resistance as compared to Comparative Example 1. The reason is that the PET material used for the carcass ply in each of Examples 1 to 5 is more excellent in tensile strength than the rayon material used for the carcass ply of Comparative Example 1.

DESCRIPTION OF SYMBOLS

2: carcass
3: side-reinforcing rubber
4: bead filler
5: bead core
6: reinforcing cord layer
7: bead portion
8: sidewall portion
9: belt
10: tread portion
100: conventional run-flat tire
101: run-flat tire of the present invention
102: run-flat tire of the present invention 103: run-flat tire of the present invention
104: run-flat tire of the present invention
105: run-flat tire of the present invention
G: road surface
CH: folding height of carcass
RH: folding height of reinforcing cord layer

The invention claimed is:

1. A run-flat tire, comprising:
a carcass, as a frame, formed of at least one carcass ply toroidally extending across between bead cores embedded in a pair of bead portions, the at least one carcass ply extending as being wound around a bead core in each bead portion from inside to outside in the tire width direction;
a bead filler in each bead portion arranged on the outside of the bead core in the tire radial direction;
a belt and a tread portion arranged in order on the outside of a crown portion of the carcass in a radial direction;
a sidewall portion falling between the tread portion and each of the bead portions; and
a side-reinforcing rubber arranged on the inside of the carcass at each sidewall portion in the tire width direction,
wherein the at least one carcass ply includes cords made of a material having a thermal shrinkage rate of 2% to 8% at 177° C.;
wherein the run-flat tire further includes, on the outside of the side-reinforcing rubber of each sidewall portion in the tire width direction, a reinforcing cord layer including cords made of a cellulosic fiber material having a thermal shrinkage rate of less than 2% at 177° C.;
wherein the reinforcing cord layer is arranged adjacent to the carcass on the outside of the carcass in the tire width direction; and
wherein the reinforcing cord layer has an end portion on the belt side lying on the inside in the tire width direction than an end portion of the belt in the belt width direction, and the reinforcing cord layer further has another end portion on the bead side, the another end portion extending as being wound around the bead core so as to be folded back at the bead core from inside to outside in the tire width direction, the reinforcing cord layer covering and restraining the bead filler in each bead portion.

2. The run-flat tire according to claim 1, wherein the at least one carcass ply includes cords made of polyester fibers.

3. The run-flat tire according to claim 1, wherein the cords of the reinforcing cord layer are at an inclination angle of 0 to 20 degrees with respect to the tire radial direction.

4. The run-flat tire according to claim 1, wherein the carcass folding height of the leading end of the carcass is 25 mm or less from a bead base line in the tire radial direction.

* * * * *